United States Patent [19]

Wolrich et al.

[11] Patent Number: 4,887,232
[45] Date of Patent: Dec. 12, 1989

[54] APPARATUS AND METHOD FOR PERFORMING A SHIFT OPERATION IN A MULTIPLIER ARRAY CIRCUIT

[75] Inventors: Gilbert M. Wolrich, Framingham; Edward J. McLellan, Milford; Robert A. J. Yodlowski, Hudson, all of Mass.

[73] Assignee: Digital Equipment Corporation, Maynard, Mass.

[21] Appl. No.: 50,749

[22] Filed: May 15, 1987

[51] Int. Cl.$^4$ ............................. G06F 7/38; G06F 7/52
[52] U.S. Cl. ................................ 364/754; 364/715.08
[58] Field of Search ............... 364/748, 754, 757, 768, 364/787, 758, 760, 715.08

[56] References Cited

U.S. PATENT DOCUMENTS

| 4,229,800 | 10/1980 | Gregorian et al. | 364/757 |
| 4,546,446 | 10/1985 | Machida | 364/757 |
| 4,718,031 | 1/1988 | Nukiyama | 364/754 |
| 4,748,584 | 5/1988 | Noda | 364/760 |
| 4,752,905 | 6/1988 | Nakagawa et al. | 364/754 |

OTHER PUBLICATIONS

Mead et al., "Introduction to VLSI Systems", Addison-Wesley Publishing Company, 1980, pp. 145-180.

Primary Examiner—Gary V. Harkcom
Assistant Examiner—Long Thaml Nguyen
Attorney, Agent, or Firm—William W. Holloway; William C. Cray

[57] ABSTRACT

In floating point operations, it is necessary to align the fractions of the floating point operands before addition or subtraction operations can be executed. This fraction alignment is performed by a shifting operation, typically using dedicated apparatus such as a barrel shifter. While the dedicated apparatus provides high performance in the execution of the shifting operation, this performance is accomplished by reserving a portion of the substrate area for apparatus implementation. To avoid the use of dedicated apparatus, the shifting operation is performed in a multiplier unit, according to the present invention, by entering the number to be shifted in the multiplicand register of the multiplier unit while entering appropriate control signals in the multiplier register. In this manner, a shifting operation can be performed without dedicated apparatus and with minor impact on performance.

19 Claims, 2 Drawing Sheets

1

APPARATUS AND METHOD FOR PERFORMING A SHIFT OPERATION IN A MULTIPLIER ARRAY CIRCUIT

BACKGROUND OF THE INVENTION

1. Field of the Invention

This invention relates generally to data processing systems and, more particularly, to apparatus for performing floating point operations.

2. Description of the Related Art

The floating point format, in which a number is represented by a (binary) number or fraction with the decimal point in a predetermined position and a number representing the argument of an exponent, has the advantage that the range of numbers capable of being represented in a given storage space is greatly expanded. However, in order to add or subtract two numbers in the floating point format, the fractions of the two numbers must first be aligned so that the decimal point is in the appropriate (aligned) positioned during the operation. A difference is determined between the two number exponent arguments and the difference is used to control the shifting (alignment) of the number fractions.

In the related art, the barrel shifter is typically employed to provide the shifting operation. The barrel shifter provides a crossbar switch between the elements of two buses, control signals determining the element of the first bus coupling the element of the second bus. (The barrel shifter is described in Chapter 5. "Introduction to VLSI Systems" by Carver Mead and Lynn Conway, Addision-Wesley Publishing Company {1980}.) Although this type of shifting apparatus provides high performance, the number of switches (i.e., transistor gate elements) between the two buses requires a large amount of substrate area when implemented using integrated circuit techniques.

A need has therefore been felt for a technique that would permit an alignment (shifting) operation of a binary number that does not involve dedicated apparatus and which does not have an unacceptable impact on performance.

FEATURES OF THE INVENTION

It is an object of the present invention to provide an improved data processing unit.

It is a feature of the present invention to provide an improved unit for performing the shifting operation in a floating point processing unit.

It is yet another feature of the present invention to use a multiplier unit to execute a shift operation in a data processing system.

It is still another feature of the present invention to use a multiplier unit, implemented by carry/save adder units, to execute a shift operation in a data processing system.

It is still further feature of the present invention to use a multiplier unit implemented by carry/save adder units and employing a retirement algorithm to execute a shift operation in a data processing system.

It is yet a further feature of the present invention to implement shifting operations involving large bit position shifts by multiple passes through a multiplier unit.

SUMMARY OF THE INVENTION

The aforementioned and other features are accomplished, according to the present invention, by executing the shift operation with multiplier apparatus. The multiplier apparatus typically has shifting apparatus included to shifting apparatus used to align partial sums for combination according to the appropriate algorithm. In the preferred embodiment, the multiplier apparatus is implemented with carry/save adder units under the control of a two bit retirement algorithm. By entering the signal group to be shifted in the multiplicand register and by placing appropriate control signals in the multiplier register, the signal group can be shifted by a predetermined amount with minor impact on processing performance while eliminating dedicated shift apparatus. For shifting operations involving large shifts, multiple passes through the multiplier apparatus can be used.

These and other features of the present invention will be understood upon reading of the following description along with the drawings.

DESCRIPTION OF THE PREFERRED EMBODIMENT

1. Detailed Description of the Figures

Figure 1:
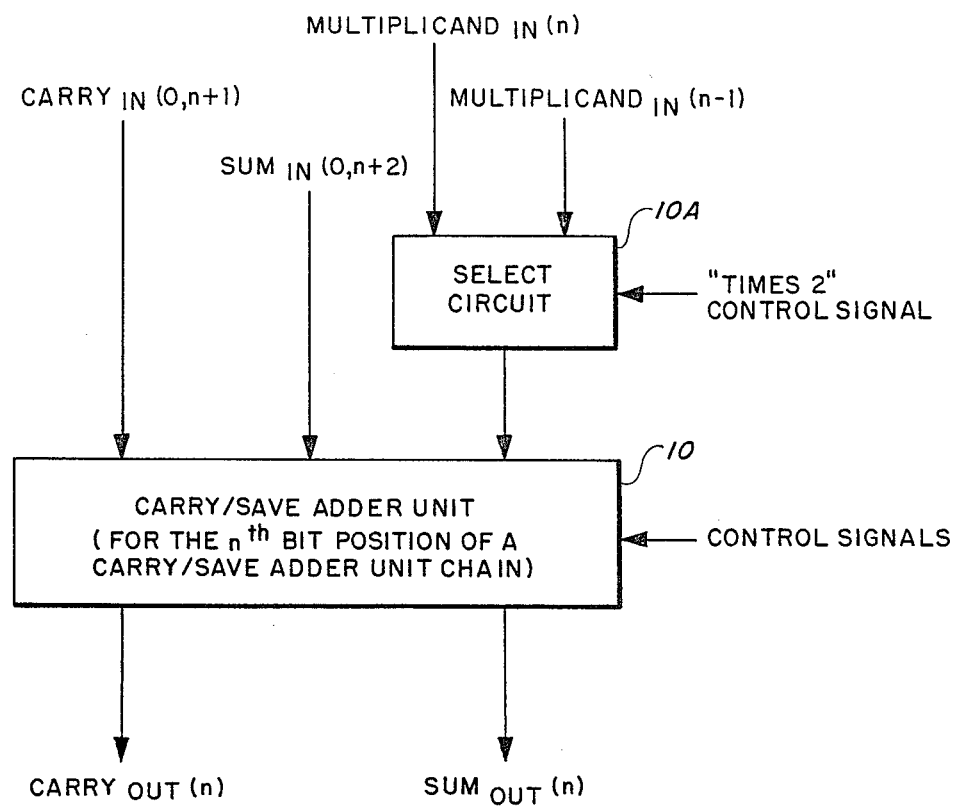
FIG. 1 illustrates the input signals and the output signals of the carry/save adder unit according to the present invention.

Referring now to FIG. 1, the input and output signals of the carry/save adder unit 10 for the $n^{th}$ bit position of a carry/save adder unit stage of the present invention is shown. The carry/save adder unit 16 receives a $CARRY_{IN}(O, n+2)$ and a $SUM_{IN}(O, n+2)$ signal. The O value designates the signal applied the first carry/save adder stage for the initial operation involving the multiplicand register, while the $n+1$ and $n+2$ values designate bit positions for a prior carry/save adder unit stage which applies these input signals to carry/save adder unit 10. The select circuit 10A, in response to the "times 2" control signal, applies the signal stored in multiplicand register bit position $(n-1)$, $MULTIPLICAND_{IN}(n-1)$, to the carry/save adder unit 10. Otherwise, the signal stored in the multiplicand register bit position $(n)$, $MULTIPLICAND_{IN}(n)$, is applied to carry/save adder unit 10. As a result of the three logic signals and control signals (to be described below) being applied to the carry/save adder unit 10, a $CARRY_{OUT}(n)$ signal and a $SUM_{OUT}(n)$ signal are generated.

Figure 2:
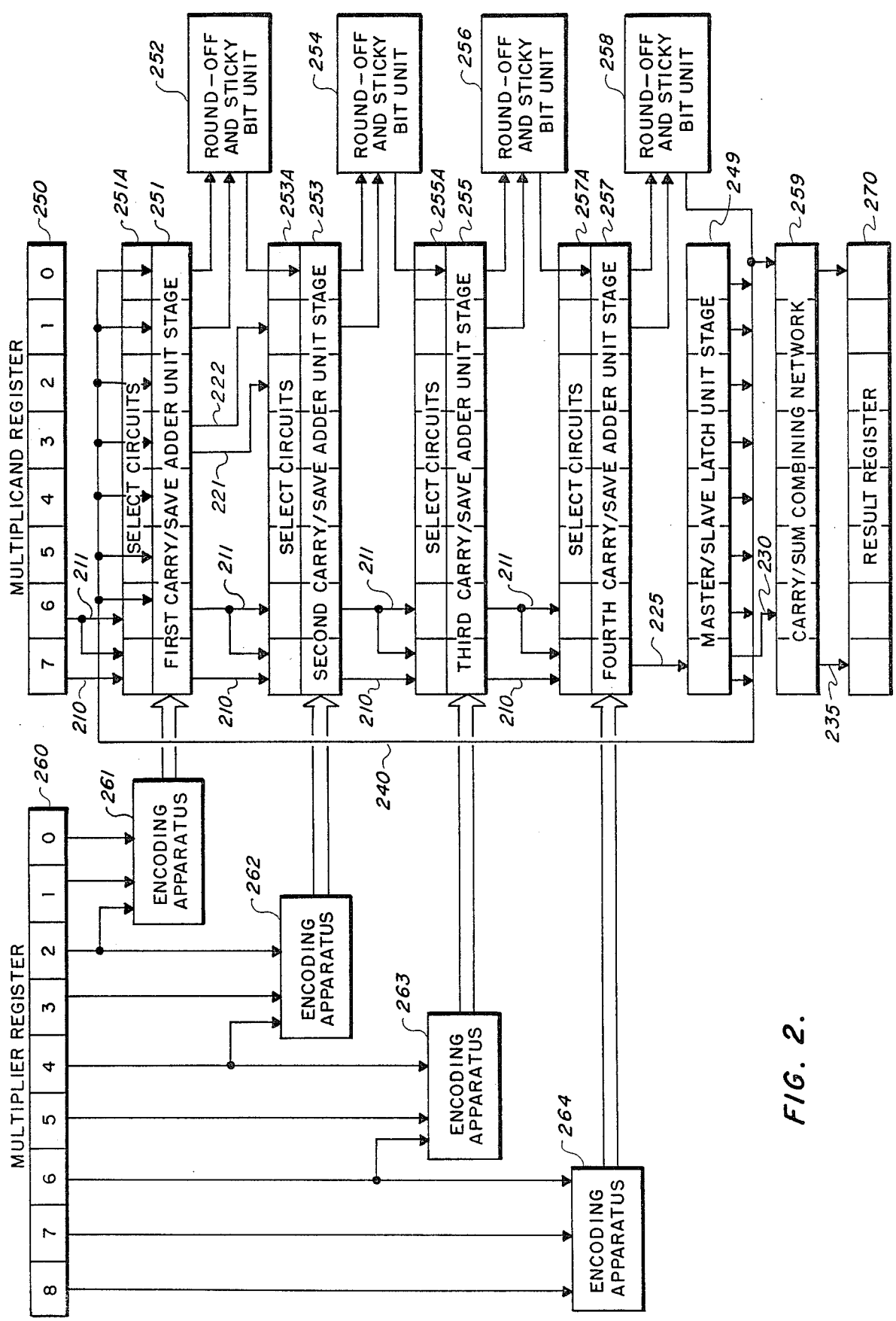
FIG. 2 is a block diagram of a multiplier unit capable of implementing the present invention.

Referring now to FIG. 2, a block diagram of a multiplier unit (or apparatus), capable of using the present invention, is shown. The multiplier unit includes a multiplicand register 250 and a multiplier register 260. The signals stored in each bit of the multiplicand register 250 can be applied to input terminals of select circuits 251A associated with the first carry/save adder unit stage 251, select circuits 253A associated with the second carry/save adder unit stage 253, select circuits 255A associated with the third carry/save adder unit stage 255 and select circuits 257A associated with the fourth carry/save adder unit stage. The select circuits 251A, 253A, 255A and 257A perform the function illustrated by 10A in FIG. 1 and apply either the signal from the bit positions of the multiplicand register to either the equivalent bit positions of the carry/save adder unit stage or to the equivalent bit positions plus one of the carry/save adder unit stage (equivalent to a multiplication by two). The state of "times 2" control signal (cf. FIG. 1) determines which multiplicand register bit position signal is applied to the carry/save adder unit stage bit position. The electrical coupling between the multiplicand register 250 and the select circuits 251A, 253A, 255A and 257A and the associated carry/save adder unit stages 251, 253, 255 and 257 is illustrated for the 7th multiplicand register bit position by conducting element 210. The output signal of each carry/save adder unit stage is a quantity related to the partial sum of the multiplication. The divergence of the output signals of a carry/save adder unit stage from the true partial product is the result of maintaining the carry signals separate from the sum signals. This separation eliminates the potentially slow combining operation after each carry/save adder unit stage. The look-ahead technique that incorporates the third bit, in addition to the two bits operating on the multiplicand signals (via the carry/save adder stage), provides for the combination of the carry and sum signals in all but the final carry/save adder unit stage. The quantity stored by the fourth (and potentially final) carry/save unit stage 257 is the final result of the multiplication operation. The signals from the fourth carry/save adder unit array 257 are applied to input terminals of the master/slave latch unit stage 249 without bit position shift as illustrated by path 225. However, prior to storing the data group at the output terminals of master/slave latch unit stage 259 in the result register 270, the carry bits must be combined with the sum bits of the partial product. This combining operation is performed in carry/sum combining network 259 after shifting the output signals one position to the right as illustrated by path 230 in FIG. 2. Round-off and sticky bit unit 258 is provided to implement an algorithm compensating for a round-off error in the multiplication operation or to retain information concerning signals removed from the purview of the data processing system by the shifting operation. After the combining of the partial sum with the unassimilated carry signals has taken place in the carry/sum combining network 259, the resulting quantity is stored in the result register 270 without shifting as illustrated by path 235 in FIG. 2. In the multiplication unit illustrated in FIG. 2, the apparatus is arranged to perform multiplication involving the two remaining least significant bits of the multiplier register 260 that have not yet been applied to signals of the multiplicand register 250. This procedure is referred to as a two bit retirement (i.e., of the multiplier) algorithm. As a result, the partial sum signals are shifted two positions (to the right) between successive carry/save adder unit stages, while the carry signals are shifted one position to the right. This shifting is illustrated by the arrow 221 from the 3rd bit position of the first carry/save adder unit stage 251 to the 2nd bit position (for the carry signal) of second carry/save adder unit stage 253 and by the arrow 222 from the 3rd bit position of first carry/save adder unit stage 251 to the 1st bit position (for the partial sum) of the second carry/save adder unit stage 253. Because of the shifting of the partial sums between carry/save adder unit stages, the round-off and sticky bit units 252, 254, 256 and 258 are included to implement strategies minimizing the loss of information resulting from removal of data signals from signal bit field manipulated by the data processing system.

To provide for greater bit position shifts than are possible by a single transit through the multiplier unit (i.e., seven bit position shifts in the apparatus of FIG. 2), apparatus is provided for multiple passes through the multiplier unit. In order to provide multiple passes through the multiplier unit, the $CARRY_{OUT}$ and $SUM_{OUT}$ signals from the master/slave latch unit stage are applied to the first carry/save adder unit stage 251 by the electrical coupling illustrated by path 240. The $CARRY_{OUT}$ signal is shifted to the right by one position in this signal transfer, while the $SUM_{OUT}$ signal is shifted two positions to the right, thus maintaining the typical carry/save adder unit interstage transfer procedure of the multiplier unit. The presence of this path permits shifts of eight bit positions or more to be accommodated by the present invention. The use of the master/slave latch unit stage 249 prevents possible race conditions from occurring when the shifted data signal group is returned to the first carry/save adder unit stage, the signals groups being isolated by the strobing of the signal groups into the slave portion of the latch units.

FIG. 2 also illustrates the procedure for implementing the two bit retirement algorithm. The two least significant bits of the multiplier register not previously combined with the multiplicand register plus the next most significant bit are applied to encoding apparatus 261. Based on these signals, the encoding apparatus 261 applies control signals to the first carry/save adder unit stage 251.

Referring to Table A, the relationship of the group of signals in the multiplier register to the operation performed on the signals of the multiplicand register and to the control signals for the carry/save adder unit stage is shown for the preferred embodiment.

TABLE A

| MULTIPLIER BITS | OPERATION | ZERO | ADD | SHIFT |
|---|---|---|---|---|
| 000 ... 0 | ADD 1 TIMES MULTIPLICAND | 1 | — | — |
| 001 ... +1x | ADD 1 TIMES MULTIPLICAND | 0 | 1 | 0 |
| 010 ... +1x | ADD 1 TIMES MULTIPLICAND | 0 | 1 | 0 |
| 011 ... +2x | ADD 2 TIMES MULTIPLICAND | 0 | 1 | 1 |
| 100 ... −2x | SUBTRACT 2 TIMES MULTIPLICAND | 0 | 0 | 1 |
| 101 ... −1x | SUBTRACT 1 | 0 | 0 | 0 |

TABLE A-continued

| MULTIPLIER BITS | OPERATION | ZERO | ADD | SHIFT |
| --- | --- | --- | --- | --- |
| 110 ... −1x | TIMES MULTIPLICAND SUBTRACT 1 TIMES MULTIPLICAND | 0 | 0 | 0 |
| 111 ... 0 | | 1 | — | — |

The carry/save adder units can perform multiplication using three control functions. The first function, termed ZERO in FIG. 2, passes the partial product through the carry/save adder unit stage without any operation other than the carry/save adder unit interstage shift operation being performed thereon. The second function, referred to as ADD in FIG. 2, adds or subtracts one times the signals of the multiplicand register to the partial product applied to the carry/save adder unit stage receiving the control signals. In the preferred embodiment, a logic "1" control signal indicates the addition operation while the logic "0" control signal indicates the subtraction operation. The third function, referred to as SHIFT in FIG. 2, adds 2 times the signals of the multiplicand register to the partial product applied to the carry/save adder unit stage. This "2" times control function is implemented by select circuit 10A in FIG. 1 and by select circuits 251A, 253A, 255A and 257A in FIG. 2. Thus, when the multiplier register includes a signal group 000, no operation is performed on the partial product, so the control signal group applied to the carry/save adder unit stage is ZERO=1, ADD=— and SHIFT=—. When the group of signals from the multiplier register is 001, the operation on the partial product is an add one times the multiplicand to the partial product and the control signals applied to the carry/save adder unit stage are ZERO=0, ADD=1 and SHIFT=0. Similarly, each group of signals XXX in the multiplier register results in a predetermined group of ZERO, ADD and SHIFT control signals.

Referring next to Table B, the control signals required to provide a zero to eight bit position shifting operation, according to the present invention, is shown.

When a zero bit position shift is desired, then the control signals ZERO=1, ADD=— and SHIFT=— are applied to the first, second and third carry/save adder unit stage. Thus, the signals from the multiplicand register are not operated on in the first three carry/save adder unit stages and the partial product applied to the fourth carry/save adder unit stage is zero. The fourth carry/save adder unit stage adds one times the multiplicand to the (zero) partial product and shifts the result of the addition (i.e., the contents of the multiplicand register) one position to the left. The left shifting operation is to compensate for the final one position right shift prior to storage of the signal group into the result register. In order to provide a one bit position shift operation, the control signal group ZERO=1, ADD=— and SHIFT=— are applied to the first, second and third carry/save adder unit stage. The control signals ZERO=0, ADD=1 and SHIFT=0 are applied to the fourth carry/save adder unit stage. These groups of control signals cause a zero partial sum to be applied to the fourth carry/save adder array and one times the contents of the multiplicand register to be added to the (zero) partial sum. Because of the one bit position shifting operation prior to the signal group storage into the result register, the contents of the multiplicand register are shifted one position to the right. Table B illustrates the control signals that will result in zero to seven bit position shifts to the right. The carry/save adder unit shift of two bit positions and the shift of one bit position prior to storage in the register occurring in the carry/save adder unit stage following the insertion of the contents on the multiplicand register into one of the carry/save adder unit stages. When the control signals ZERO=1, ADD=— and SHIFT=— are applied to all four carry/save adder unit stages, then the signals of the original multiplicand register are applied to the first carry/save adder stage 251 shifted eight positions to the right. 2. Operation of the Preferred Embodiment The use of carry/save adders to implement the multiply operation eliminates the potentially slow ripple carry operation required for the combination of partial sums of the operation. Only after the final carry/save adder unit stage do the carry signals have to be combined with the associated partial product to provide the result in the multiplier unit.

Similarly, the retirement algorithm, by which more than one of the multiplier signals is combined with the multiplicand signals in the carry/save adder unit stage, reduces the number of stages required to perform the operation at the cost of increased complexity of the each carry/save adder units.

In the present invention, the inherent capability of the multiplier unit to perform a shift operation is used to perform a controllable shift operation. The functions of

TABLE B

| | MULTIPLIER CONTROL SIGNALS TO PERFORM THE SHIFTING OPERATION | | | | | | | | | | | |
| --- | --- | --- | --- | --- | --- | --- | --- | --- | --- | --- | --- | --- |
| | STAGE 1 | | | STAGE 2 | | | STAGE 3 | | | STAGE 4 | | |
| | ZERO | ADD | SHIFT | ZERO | ADD | SHIFT | ZERO | ADD | SHIFT | ZERO | ADD | SHIFT |
| SHIFT 0 | 1 | — | — | 1 | — | — | 1 | — | — | 0 | 1 | 1 |
| SHIFT 1 | 1 | — | — | 1 | — | — | 1 | — | — | 0 | 1 | 0 |
| SHIFT 2 | 1 | — | — | 1 | — | — | 0 | 1 | 1 | 1 | — | — |
| SHIFT 3 | 1 | — | — | 1 | — | — | 0 | 1 | 0 | 1 | — | — |
| SHIFT 4 | 1 | — | — | 0 | 1 | 1 | 1 | — | — | 1 | — | — |
| SHIFT 5 | 1 | — | — | 0 | 1 | 0 | 1 | — | — | 1 | — | — |
| SHIFT 6 | 0 | 1 | 1 | 1 | — | — | 1 | — | — | 1 | — | — |
| SHIFT 7 | 0 | 1 | 0 | 1 | — | — | 1 | — | — | 1 | — | — |
| SHIFT 8 | 1 | — | — | 1 | — | — | 1 | — | — | 1 | — | — | the carry/save adder unit, without additional apparatus, can provide the operational capability. Therefore, the appropriate signals can be placed in the multiplier register to provide the appropriate control signals to the carry/save adder unit stages. Thus, the shifting operation requires only the capability to translate the desired bit position shift quantity into signals that can be entered into the control register or can be applied directly to the carry/save adder unit stages. Because the multiplier unit is implemented for high performance, the shift operation performed in the multiplier unit is relatively fast.

In the preferred embodiment, when multiplication operations involving larger data signal groups than can be accommodated by the multiplicand register is to be executed, a wrap-around procedure is employed. The wrap-around procedure is accompanied by a two position shift to the right. This wrap-around shift must be taken into account when shifting operations greater than seven bit positions (i.e., in the example used herein) are required. As illustrated in FIG. 2 and Table B, a complete pass through the multiplier unit by a signal group after which the signal group is reintroduced to the first carry/save adder stage involves an eight position shift, while a pass through the multiplier unit involving signals that are entered in the result register 270 can involve zero to seven bit position shifts. The master/slave latch unit 249 can apply signals to both the carry/sum combining network 259 and to the first carry/save adder unit stage 251. In this manner, multiple passes through the multiplier unit can be accommodated.

Although the present invention has been discussed in terms of a two bit retirement procedure, it will be clear that the technique of the present invention can be applied to retirement procedures involving different numbers of bits. Similarly, the present invention has been illustrated for eight bit position fields. It will be clear that the length of the data field, and consequently the registers, can be of different lengths without departing from the invention.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for shifting a group of logic signals a controllable number of positions to the right, said apparatus comprising:
    a multiplier unit including;
        a first operand register for storing a multiplicand operand,
        a second operand register for storing a multiplier operand,
        a plurality of sequential stages including carry/save adder units, each of said carry/save adder unit stages receiving logic signals from a next previous stage and from said first operand register,
        an encoding unit coupled to each stage and responsive to logic signals from selected positions of said second operand register, said encoding unit providing control signals to said coupled carry/save adder stage, said control signals causing said coupled carry/save adder stage to process logic signals from a next previous carry/save adder unit stage and from said first operand register in a predetermined manner, wherein paths between a carry/save adder unit stage and a next sequential carry/save adder unit stage include signal paths for shifting logic signals at least one bit position; and
    conversion means for converting a shift operand indicating a number of positions said group of logic signals is to be shifted into shift signals to be applied to said encoding means, said group of logic signals being entered in said first operand register, wherein control signals generated in response to said shift signals cause said group of logic signals to be shifted said number of positions.

2. The shifting apparatus is implemented to execute a two bit retirement algorithm to perform a multiplication operation.

3. The shifting apparatus of claim 2 wherein each of said carry/save adder unit stages responds to a first set of control signals by passing a partial sum through said each carry/save adder unit stage without a processing operation, said each carry/save adder unit stage responding to a second control signal by adding one time said first operand register logic signals to a partial product applied to said each carry/save adder unit stage from a next previous carry/save adder unit stage, said each carry/save adder unit stage responsive to said second and to a third control signal for adding two times said first operand register logic signals to a partial product applied to said each carry/save adder unit stage from a next previous carry/save adder unit stage.

4. The shifting apparatus of claim 3 wherein said multiplier unit provides a one bit position shifting apparatus following a final carry/save adder unit stage.

5. The shifting apparatus of claim 1 further comprising multiple pass means for permitting said group of logic signals to be shifted by said multiplier unit a plurality of times, wherein output signals from said multiplier unit are applied to an input carry/save adder stage of said multiplier unit by said multiple pass means.

6. A method of performing a shift operation on a logic signal group, said method comprising steps of:
    entering said logic signal group in a multiplicand register of a multiplier unit implemented by a plurality of carry/save adder unit stages, each of said carry/save adder unit stages having a control device connected therewith for applying control signals to said each carry/save adder unit stage, said control signals causing said each carry/save adder stage to combine a partial product with said logic signal group according to a multiplicity of operations, wherein said control signals are determined by groups of logic signals in a multiplier register located at positions related to said carry/save adder unit stages;
    determining a shift operand for shifting said logic signal group a preselected number of positions, said shift operand providing shift control signals, said shift control signals causing said carry/save adder unit stages to shift an operand in said multiplicand register said preselected number of positions; and executing an operation determined by said shift operand and by using said multiplier unit.

7. The method of claim 6 further including the step of implementing said multiplier unit with apparatus performing a multiplication operation by a retirement algorithm for a group of logic signals in said multiplier register.

8. The method of claim 7 further including a step of cycling said logic signal group through said multiplier unit a plurality of times.

9. The method of claim 7 wherein said step of executing said operation includes the steps of passing a partial product through a carry/save adder stage without processing, adding said logic signal group to a carry/save adder stage, and shifting said logic signal group one position in an opposite direction from said preselected number of positions.

10. The method of claim 9 wherein said executing step can include an adding step and a shifting step performed by a same carry/save adder stage.

11. Apparatus for performing a controllable shift operation on a data signal group, said apparatus comprising:
first register means for storing said data signal group;
a plurality of carry/save arrays, each carry/save array including:
a multiplicity of carry/save adder units; and
a selector circuit connected to with each carry/save adder unit for selecting either an input signal from a corresponding bit position of said first register means or an input signal from a neighboring position of said corresponding bit position; each of said carry/save adder units providing a sum output signal and a carry output signal in response to a carry input signal, a sum input signal and a selected signal from said connected selector circuit; wherein output signals from a carry/save array are input signals for a next sequential carry/save array, said input signals being applied to a carry/save adder unit shifted a predetermined number of bit positions when applied to said next sequential carry/save array; and
a plurality of control means, each of said control means coupled to a carry/save adder array, said each control means for applying control signals to said coupled carry/save array for providing preselected operations on carry/save input signals; and
a second register means coupled to said plurality of control means, a multiplier operand in said second register means causing said carry/save arrays to perform said selected operations in a manner to provide a product of said data signal group and said multiplier operand in a first mode of operation, a shift operand in said second register means causing said data signal group to be shifted a predetermined number of positions in a second mode of operation.

12. The apparatus of claim 11 wherein said multiplier operand is converted by said control means into retirement algorithm control signals causing said carry/save arrays to perform multiplication using a retirement algorithm.

13. The apparatus of claim 12 wherein said retirement algorithm is a two bit retirement algorithm, said control signals including a control signal for application to said selector circuit.

14. The apparatus of claim 13 wherein said control signals include a pass control for passing a signal group through a coupled carry/save array without change.

15. The apparatus of claim 13 wherein said control signals include an enter control signal for entering a data signal group from said first register means in a coupled carry/save array.

16. The apparatus of claim 11 wherein output signals from a last carry/save array are coupled to input signal terminals of a first carry/save array when a single processing by said plurality of carry/save arrays can not shift said data signal group said predetermined number of positions in said first mode of operation.

17. The apparatus of claim 16 further comprising a combining network, wherein said last carry/save array output signals are coupled to said combining network, said output sum and said carry output signals being combined to form a product operand in said combining network in said first mode of operation.

18. The apparatus of claim 17 wherein said plurality of carry/save arrays includes 4 carry/save arrays, wherein said predetermined number is one through seven.

19. The apparatus of claim 16 wherein a predetermined number greater than seven requires a plurality of processing procedure by said apparatus.

* * * * *